US006882284B2

(12) United States Patent
Lake et al.

(10) Patent No.: US 6,882,284 B2
(45) Date of Patent: *Apr. 19, 2005

(54) ELECTRICAL APPARATUSES, METHODS OF FORMING ELECTRICAL APPARATUSES, AND TERMITE SENSING METHODS

(75) Inventors: Rickie C. Lake, Eagle, ID (US); Mark E. Tuttle, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/346,868

(22) Filed: Jan. 17, 2003

(65) Prior Publication Data

US 2003/0128119 A1 Jul. 10, 2003

Related U.S. Application Data

(63) Continuation of application No. 09/754,857, filed on Jan. 4, 2001, now Pat. No. 6,515,591, which is a division of application No. 09/433,514, filed on Nov. 3, 1999, now Pat. No. 6,255,959, which is a continuation-in-part of application No. 09/373,457, filed on Aug. 12, 1999, now Pat. No. 6,373,391.

(51) Int. Cl.$^7$ .............................................. G08B 23/00
(52) U.S. Cl. ................. 340/693.5; 340/573.1; 340/573.2; 340/870.16; 340/572.1; 340/652; 73/587; 73/865.8; 43/124; 43/132.1; 424/84; 424/405; 424/410; 381/600; 381/748; 29/825
(58) Field of Search ......................... 340/573.1, 573.2, 340/572.1, 572.5, 693.5, 570.16, 652; 73/587; 865.3; 43/124, 132.1; 424/84, 405, 410; 381/600, 748; 29/825

(56) References Cited

U.S. PATENT DOCUMENTS

| 5,815,090 | A  | * | 9/1998  | Su ......................... 340/870.16 |
| 6,025,783 | A  | * | 2/2000  | Steffens, Jr. ................. 340/644 |
| 6,100,805 | A  | * | 8/2000  | Lake ....................... 340/573.1 |
| 6,255,959 | B1 | * | 7/2001  | Lake et al. ............... 340/693.5 |
| 6,313,748 | B1 | * | 11/2001 | Lake ....................... 340/573.2 |
| 6,397,516 | B1 | * | 6/2002  | Su ............................. 43/124 |
| 6,404,210 | B1 | * | 6/2002  | Su .............................. 324/692 |

* cited by examiner

*Primary Examiner*—Benjamin C. Lee
(74) *Attorney, Agent, or Firm*—Wells St. John P.S.

(57) ABSTRACT

The invention encompasses an electrical apparatus. Such apparatus includes RFID circuitry on a first substrate, and sensor circuitry on a second substrate. A receiving structure is associated with one of the RFID circuitry and the sensor circuitry, and at least one connecting structure is associated with the other of the RFID circuitry and the sensor circuitry. The at least one connecting structure is removable received within the receiving structure. The invention also encompasses a method of forming an electrical apparatus. A first substrate and a second substrate are provided. The first substrate has RFID circuitry thereon, and the second substrate has sensing circuitry thereon. A receptacle is joined with one of the RFID circuitry and the sensor circuitry, and has at least one orifice extending therein. At least one prong is joined with the other of the RFID circuitry and the sensor circuitry. The prong is removably inserted within the receptacle to electrically connect the RFID circuitry with the sensing circuitry.

9 Claims, 13 Drawing Sheets

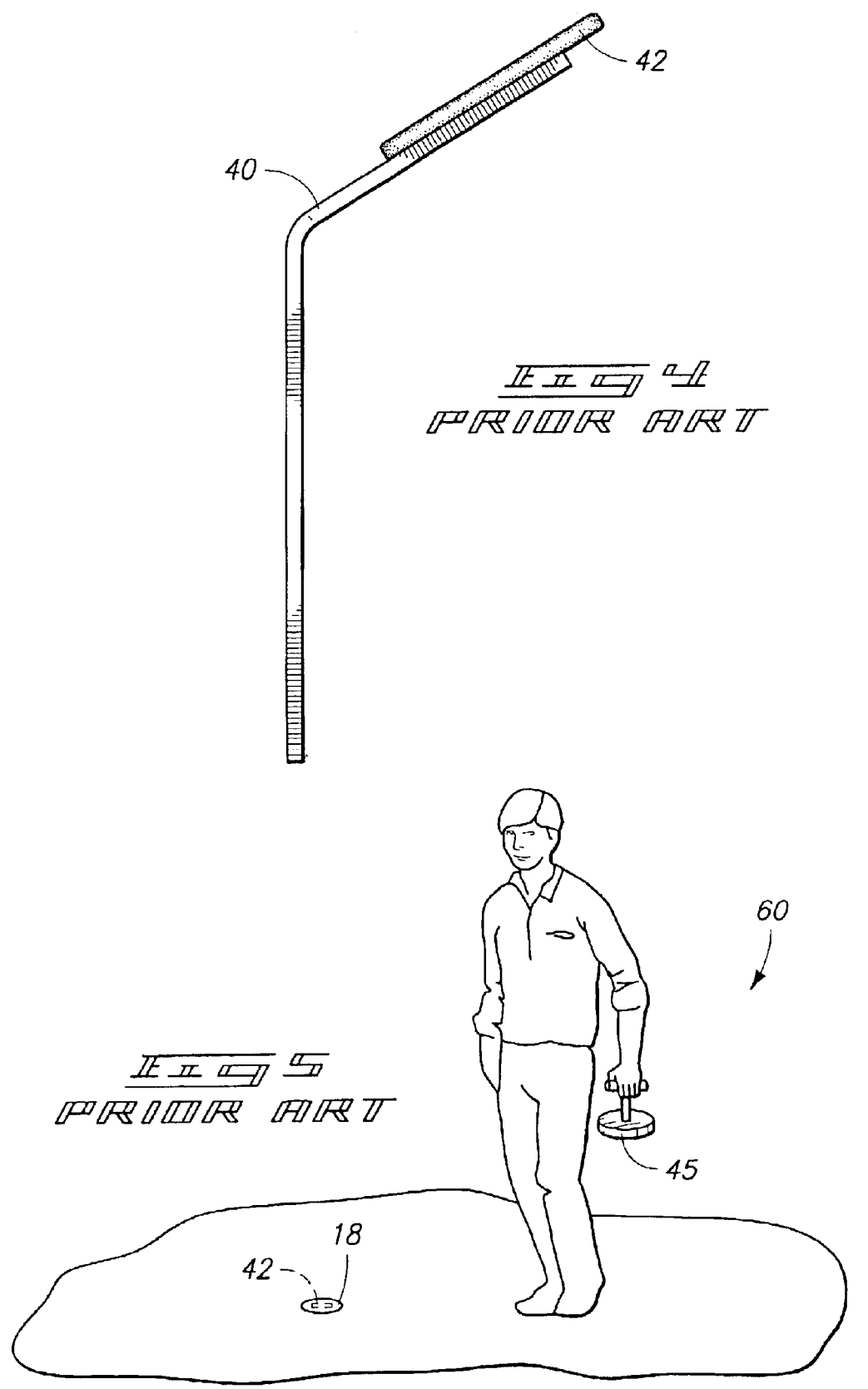

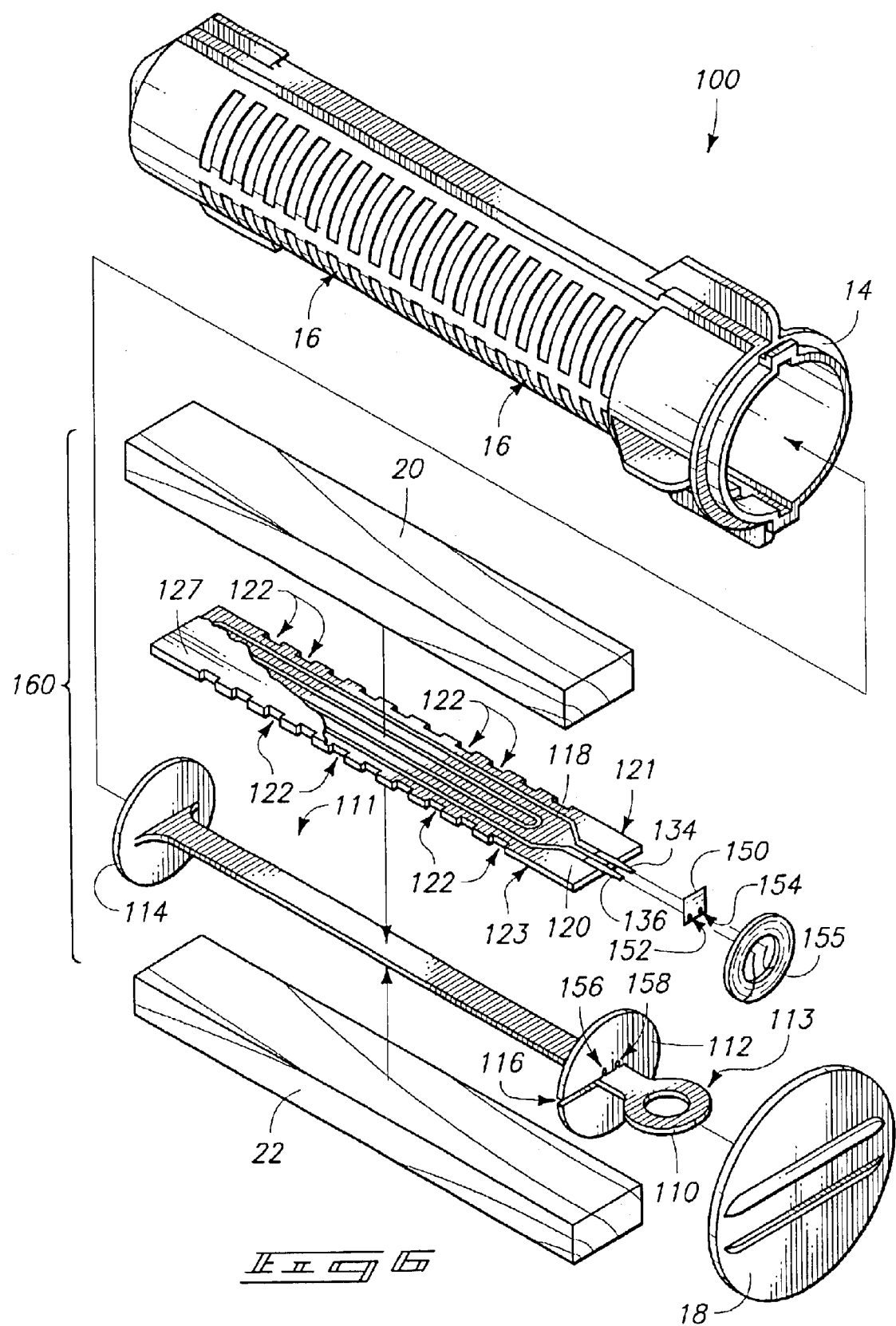

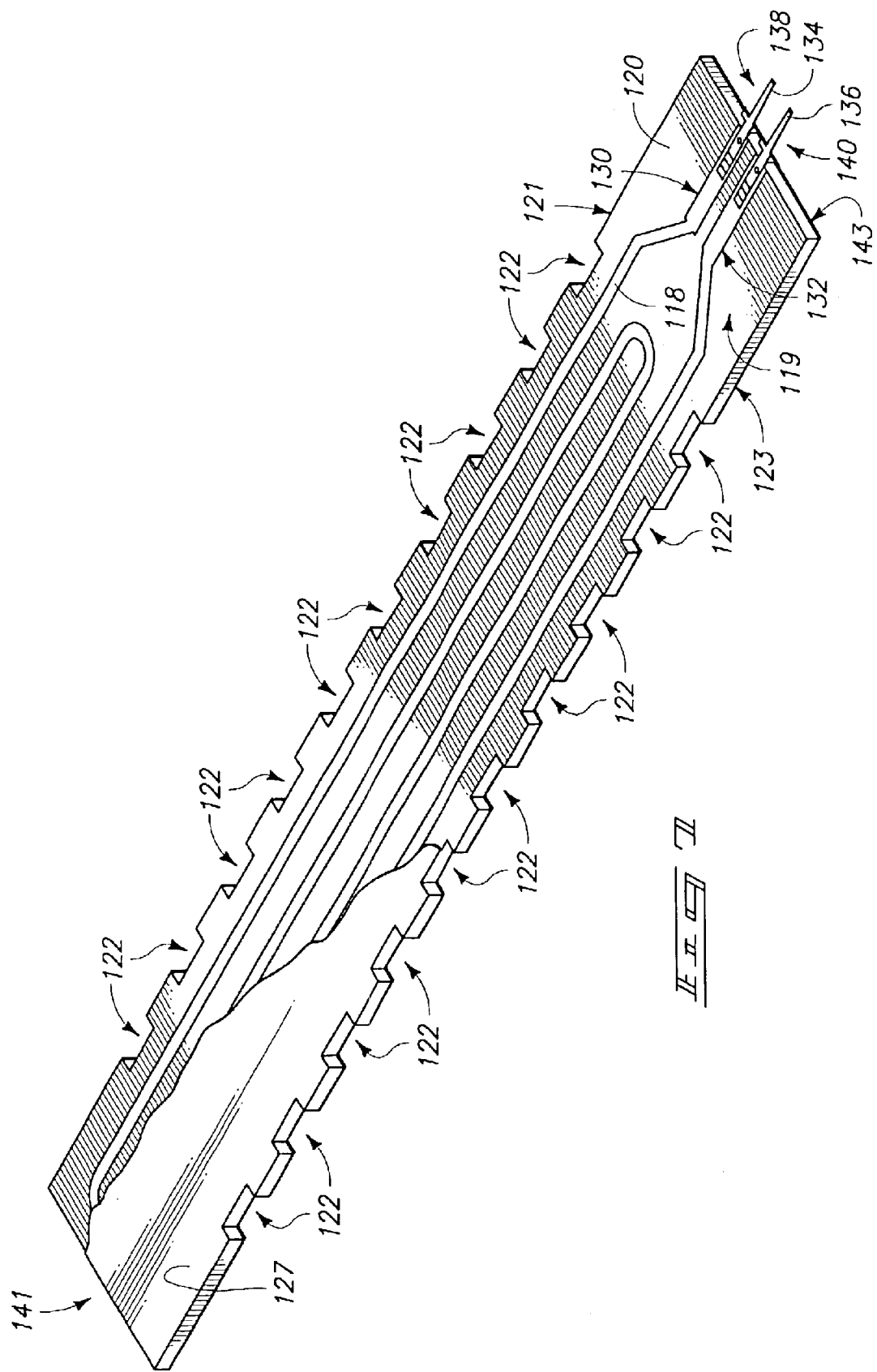

ELECTRICAL APPARATUSES, METHODS OF FORMING ELECTRICAL APPARATUSES, AND TERMITE SENSING METHODS

RELATED PATENT DATA

This patent resulted from a continuation of U.S. patent application Ser. No. 09/754,857, filed Jan. 4, 2001 now U.S. Pat. No. 6,515,591; which is a divisional application of U.S. patent application Ser. No. 09/433,514, now U.S. Pat. No. 6,255,959, which was filed on Nov. 3, 1999; and which is a continuation-in-part of U.S. patent application Ser. No. 09/373,457, which was filed on Aug. 12, 1999, and is now U.S. Pat. No. 6,373,391.

TECHNICAL FIELD

The invention pertains to electrical apparatuses, termite sensing methods, and methods of forming electrical apparatuses.

BACKGROUND OF THE INVENTION

A prior art apparatus and method for detecting termite infestation is described with reference to FIGS. 1 and 2. A termite detection device 10 is shown in an assembled configuration and inserted within the ground 12 in FIG. 1, and is shown in a disassembled configuration in FIG. 2. Device 10 comprises an outer receptacle 14 having a plurality of orifices 16 (only some of which are labeled) extending therethrough. A cap (or lid) 18 is provided to cover the top of receptacle 14. Preferably receptacle 14 is inserted into the ground to a depth at which cap 18 will rest approximately at a surface of the ground.

A pair of wooden blocks 20 and 22 are provided within receptacle 14, and constitute "bait" for termites proximate device 10. A holder 24 is provided between blocks of wood 20 and 22 and comprises a shelf 26 upon which blocks 20 and 22 rest. Holder 24 and blocks 20 and 22 together comprise an assembly 27 which can be removably inserted into receptacle 14.

Holder 24 comprises a portion 28 which protrudes upwardly beyond blocks 20 and 22 in the assembled configuration of FIG. 1. Portion 28 comprises an eye 30 (shown in FIG. 2) which can simplify removal of assembly 27 from receptacle 14 using a tool with a hook.

In operation, receptacle 14 is inserted into ground 12, and blocks 20 and 22 are subsequently left in receptacle 14 for a period of time. Blocks 20 and 22 function as a sensing apparatus to determine if a termite infestation is present in an area proximate device 10. Specifically, if termites are present, such will penetrate through orifices 16 to reach wooden blocks 20 and 22. The termites will then burrow into the wooden blocks 20 and 22.

At regular intervals, cap 18 is removed and blocks 20 and 22 withdrawn from device 14. Blocks 20 and 22 are then surveyed for termite-inflicted damage, and possibly the presence of termites themselves.

Generally, a number of apparatuses 10 will be spread around a given location, such as, for example, a house or other wooden structure. Each of the apparatuses will be checked at a regular interval to determine if a termite infestation is occurring proximate the structure. Also, each of the devices will be mapped relative to one another, and relative to the structure. A comparison of the amount of termite-inflicted damage occurring at the respective devices 10 can then enable a person to determine an approximate localized region of any occurring termite infestation. It can be advantageous to pinpoint a localized region of infestation as such can limit an amount of pesticide utilized for destroying the termites.

Difficulties can occur in monitoring the amount of termite-inflicted damage occurring at each of the many devices 10 provided around a structure. For instance, it can be difficult to regularly and accurately document the amount of damage at each of the devices. As an example, it can be difficult to remember exactly which of the various devices correlates to a specific location on a map of the devices. As another example, it can be difficult to accurately record a reading of termite-inflicted damage associated with an individual device. As yet another example, it can be tedious and time-consuming to open all of the receptacles 14 proximate a given structure and manually check the blocks 20 and 22 within the receptacles for termite-inflicted damage.

One method of reducing the above-discussed difficulties is to provide bar codes on the lids 18 of receptacles 14. Such bar codes can be scanned to specifically identify a particular device which can simplify correlating the devices to locations on a map of the devices. However, ascertaining an amount of termite-inflicted damage can still be time-consuming in that the receptacles still have to be opened and the blocks of wood manually checked to determine if termite-inflicted damage has occurred to the wood.

A recently proposed improvement for monitoring an amount of termite-inflicted damage in a device similar to device 10 is described with reference to FIGS. 3–5. Referring to FIG. 3, a sensor 40 having circuitry 41 provided thereon is provided in addition to, or in place of, the blocks of wood 20 and 22 (FIGS. 1 and 2). Sensor 40 is intended to be bent into receptacle 14 (a bent configuration is shown in FIG. 4) and to be configured such that termite-inflicted damage to sensor 40 will break the circuitry associated therewith. Sensor 40 can have a number of notches (not shown) provided therein to provide crevices for termites to burrow in.

It is suggested that a printed wiring board 42 can be provided in electrical connection with sensor 40, and that such printed board can comprise circuitry corresponding to a transponder unit. The transponder unit could, for example, comprise a parallel resonant LC circuit, with such circuit being resonant at a carrier frequency of an interrogator. Such transponder unit can be incorporated into a passive, read-only radio frequency identification device (RFID) system as described with reference to FIG. 5. Specifically, FIG. 5 illustrates an RFID system 60 comprising the transponder unit of printed wiring board 42 and an interrogator 45 configured to be passed over transponder unit 42. Interrogator 45 comprises a coil antenna configured to stimulate the transponder unit. Such coil antenna consists of one or more coils of conductive material provided within a single plane, and can be in the form of, for example, a loop antenna.

In operation, interrogator 45 provides a carrier signal which powers (stimulates) transponder unit 42 and causes a signal to be transmitted from the transponder unit. The signal comprises data which identifies the transponder unit. Such signal can also identify if the circuitry associated with sensor 40 has been broken. The signal is received by interrogator 45, and eventually provided to a processing system configured to decode and interpret the data. Such processing system can be provided in a portable unit with interrogator 45, or can be provided in a separate unit to which data from interrogator 45 is subsequently downloaded.

SUMMARY OF THE INVENTION

In one aspect, the invention encompasses an electrical apparatus. Such apparatus includes RFID circuitry on a first substrate, and sensor circuitry on a second substrate. A receiving structure is associated with one of the RFID circuitry and the sensor circuitry, and at least one connecting structure is associated with the other of the RFID circuitry and the sensor circuitry. The at least one connecting structure is removable received within the receiving structure.

In another aspect, the invention encompasses a method of forming an electrical apparatus. A first substrate and a second substrate are provided. The first substrate has RFID circuitry thereon, and the second substrate has sensing circuitry thereon. A receptacle is joined with one S of the RFID circuitry and the sensor circuitry, and has at least one orifice extending therein. At least one prong is joined with the other of the RFID circuitry and the sensor circuitry. The prong is removably inserted within the receptacle to electrically connect the RFID circuitry with the sensing circuitry.

In yet another aspect, the invention encompasses a method of sensing termites. A sensing device is formed, and, includes a loop of conductive material between a pair of wooden blocks. A circuit board is provided, and has circuitry supported thereby. The circuitry supported by the circuit board comprises at least a portion of a transponder unit. A receptacle is joined to one of the circuit board and the loop of conductive material. The receptacle has at least one orifice extending therein. At least one electrical plug is joined to the other of the circuit board and the loop of conductive material. The plug is removably inserted into the receptacle to electrically connect the loop of conductive material to the transponder circuit. A break in the loop of conductive material alters a signal transponded by the transponder circuit. The sensing device is placed in the ground, and a signal transponded by the transponder unit is monitored to determine if the loop of conductive material is broken.

BRIEF DESCRIPTION OF THE DRAWINGS

Preferred embodiments of the invention are described below with reference to the following accompanying drawings.

FIG. 4 is a diagrammatic side view of the sensor of FIG. 3 shown rotated 90° relative to the view of FIG. 3.

FIG. 5 is a diagrammatic view of a person extracting information from the prior art electronic termite sensing device of FIG. 3.

FIG. 6 is a diagrammatic, perspective view of a disassembled termite sensing device of the present invention.

FIG. 7 is a perspective view of an electronic sensing component of the device of FIG. 6.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

The invention pertains to improved devices for sensing changes in an environment proximate the devices. The changes in the environment can include, for example, changes in pressure, force, shock, temperature, or organism concentration (with the term "organism" encompassing all living creatures and including plants, bacteria, insects, birds and mammals). Changes in pressure, force, shock and temperature can be detected by, for example, providing circuitry configured to change from a closed circuit configuration to an open configuration when a trip point is passed. For instance, pressure and force can be detected by incorporating a pressure transducer or accelerometer into the circuitry. In particular aspects, the invention pertains to devices configured to sense a change in a pest concentration proximate the devices. In more particular aspects, the invention pertains to devices configured to sense termite infestation.

Figure 1:
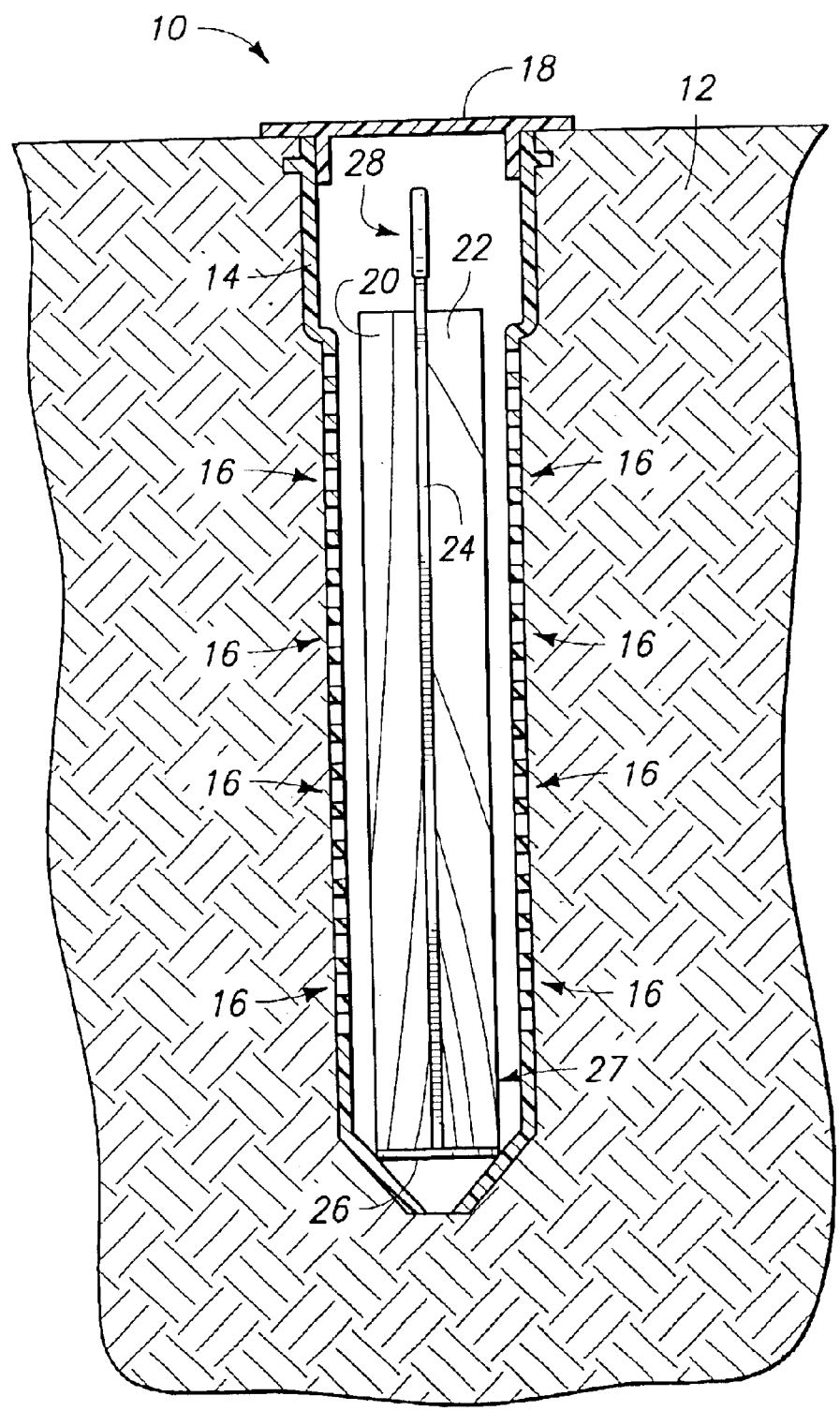
FIG. 1 is a diagrammatic, cross-sectional view of an assembled prior art termite sensing device embedded in the ground.
Figure 2:
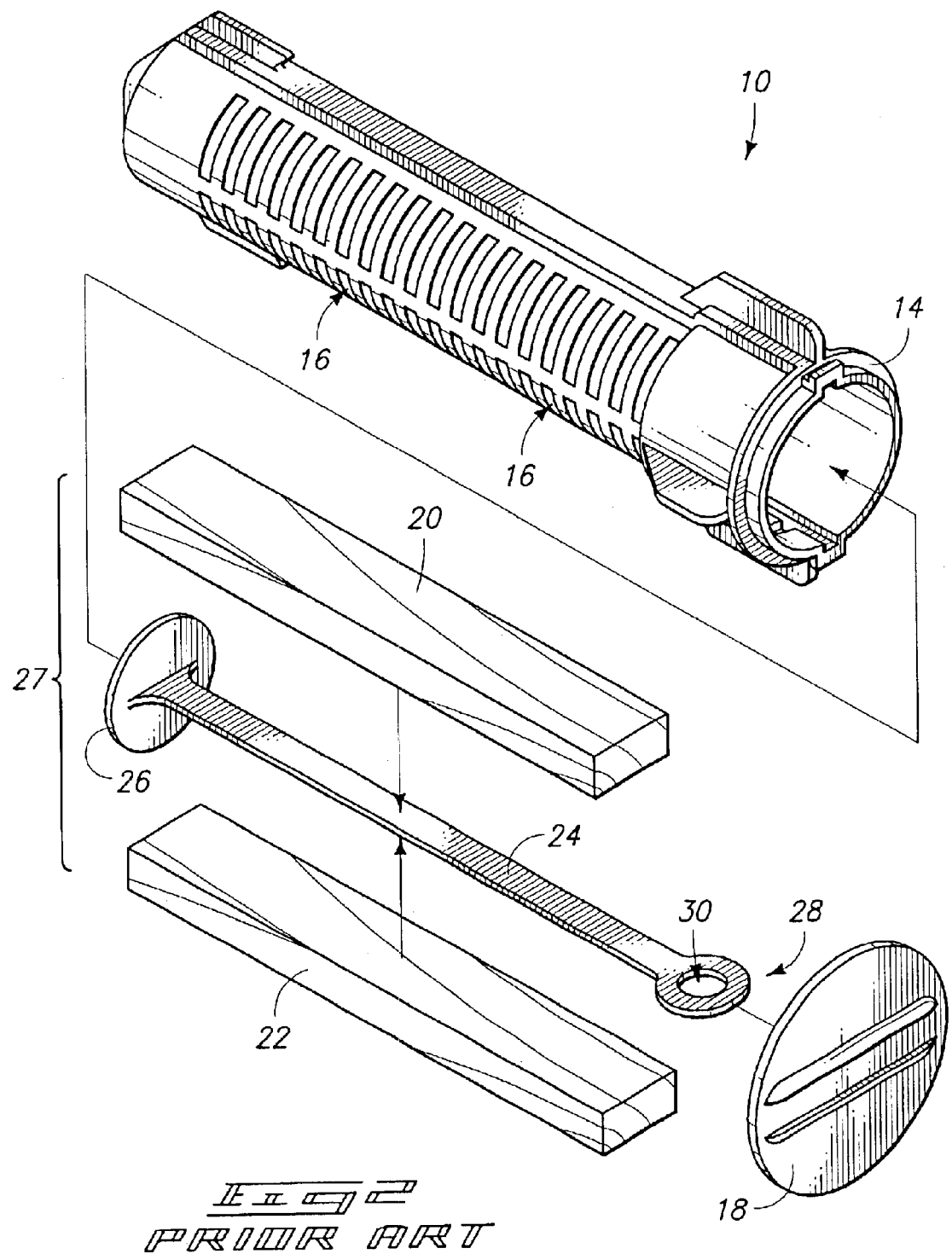
FIG. 2 is a perspective view of the prior art termite sensing device of FIG. 1 in a disassembled configuration.

A first embodiment device 100 of the present invention is described with reference to FIG. 6. Device 100 comprises a receptacle 14 of the type described above with reference to the prior art, and comprises a cap 18 configured to be received over an open top of receptacle 14. Device 100 further comprises a pair of wooden blocks 20 and 22 of the type described above with reference to the prior art, and a holder 110 similar to the holder 24 described above with reference to the prior art embodiment of FIG. 1. Holder 110 can comprise, for example, plastic. Holder 110 differs from holder 24 in that holder 110 comprises a top shelf 112 in addition to a bottom shelf 114, whereas holder 24 only comprised a bottom shelf. In the shown embodiment, shelf 112 is configured with a slit 116 so that shelf 112 can be slid over a prior art holding device (such as the device 24 of FIG. 1) to form the holding device 110 of the present invention. Slit 116 is, of course, optional, and the invention encompasses other embodiments (not shown) wherein shelf 112 is molded in one piece with the other components of holder 110. Holder 110 can be considered as comprising a pillar 111 extending between shelves 112 and 114, and an extension 113 protruding above shelf 112. Extension 113 is configured to enable a person to lift holder 110 by the extension, and in the shown embodiment comprises an eye 115 extending therethrough. Shelf 112 preferably comprises an electrically insulative material, such as, for example, plastic (for instance, polypropylene).

Device 100 further comprises an electronic termite sensing loop 118 of conductive material. In the shown embodiment, loop 118 is formed on a substantially planar substrate 120. Loop 118 is preferably formed of a material which can be removed by termites. Exemplary materials are printable materials comprising conductive particles, such as, for example metal particles or carbon particles. Suitable materials are, for example, silver-filled printed thick film ink and silver-filled epoxy. An exemplary silver-filled ink is Dupont Electronics 5028™ (available from Dupont Electronics of Wilmington, Del.), which is a silver polymer conductor.

A material that can be preferred for utilization in forming conductive loop 118 is a carbon-particle-containing ink (typically the particles will consist essentially of carbon), such as, for example, a material marked by Dupont Electronics as 7102™ Carbon Polymer Conductor (available from Dupont Electronics of Wilmington, Del.). The carbon-particle-containing ink can be screen printed onto substrate 120 to form loop 118.

Among the advantages of utilizing a carbon-particle-containing ink (relative to other materials, such as, for example, silver-filled inks) is that the carbon-particle-containing inks can be cheaper than other inks, better accepted by pests (i.e., apparently more palatable to the pests), and less subject to environmental damage. Further, the inclusion of carbon inks in a circuit can lower an electrical conductivity (i.e., raise a resistivity) of the circuit. The lowered conductivity can increase the reliability of data obtained from the circuit. More specifically, circuit 118 is utilized to detect termites by determining when the circuit is broken (with a broken circuit being referred to as a positive reading, and an indication of termite inflicted damage). The inclusion of carbon-particle-containing inks in loop 118 can render the circuit of loop 118 less susceptible to registering false negative readings if mud or water bridges an opening in the circuit. For example, if loop 118 is included in a circuit designed to indicate a break (or severance in the circuit) at a circuit resistance of 2 million ohms, and if the loop comprises a material with a resistance substantially less than 2 million ohms, a false negative status may be obtained if mud or water is bridging a severed circuit. However, if loop 118 comprises a printed material with a resistance about equal to the triggering resistance of 2 million ohms, a bridge of water or mud will increase resistance to over the triggering resistance.

It is noted that carbon-particle-containing inks can be utilized alone (such that the conductive material of loop 118 consists essentially of carbon particles), or can be utilized in combination with other conductive materials (such as, for example, silver-filled inks). The utilization of a combination of carbon-particle-containing inks and metal-filled inks can enable a resistance of loop 118 to be adjusted to a desired value.

The material of loop 118 can be formed by combining one or more of carbon-particle-containing ink, a metal-containing ink, and a dielectric material ink to form a resultant ink of desired electrical properties for loop 118. Such resultant ink can be screen-printed onto substrate 120 to form loop 118. The dielectric ink can comprise, for example, Dupont Electronics 5018™ UV curable dielectric (available from Dupont Electronics of Wilmington, Del.).

Substrate 120 is preferably formed of material which can removed by termites. Exemplary materials are polyethylene foam and paper. The conductive material of loop 118 can be directly applied to substrate 120 using, for example, screen printing methods. Substrate 120 can be pretreated prior to applying the conductive material of loop 118 over substrate 120. Such pretreatment can comprise, for example, flame pretreatment to promote adhesion of the conductive material to the foam.

An electrically insulative protective material 127 (only some of which is shown in FIGS. 6 and 7) is provided over loop 118 and substrate 120 to, for example, assist in retaining conductive loop 118 on substrate 120 and protect conductive loop 118 from water, abrasion or other environmental damage. The insulative protective material can comprise a material which is provided as a liquid and subsequently cured to form a hardened and electrically insulative material, or can comprise a solid adhered over the conductive loop 118. The insulative protective material can comprise, for example, a resin which is provided as a liquid and cured by exposure to one or more of heat, ultraviolet light and oxygen. A suitable insulative protective material is a material selected from the general class of epoxy resins (such as, for example, a two-part epoxy resin). Another suitable insulative protective material is a material selected for the general class of thick film inks. Exemplary insulative protective materials are Dupont 5015™ and 5018™ (available from Dupont Electronics of Wilmington, Del.), with 5018™ being an ultraviolet light curable dielectric material. Another exemplary insulative protective material is a tape adhered over loop 118 with an adhesive.

A termite attractant (such as, for example, a suitable pheromone) can be provided in addition to the insulative protective material. Such attractant can, for example, be formed over the insulative protective material or blended within the insulative protective material. For instance, in embodiments in which the insulative protective material comprises a material which is initially provided as a liquid, the attractant can be blended within the liquid insulative protective material. In other embodiments, the attractant can be provided in a solution which is sprayed or printed over a solid insulative protective material.

In the shown configuration, substrate 120 comprises a pair of opposing sidewall edges 121 and 123, and a plurality of notches 122 extending into sidewall edges 121 and 123. Notches 122 are provided to form crevices within which the termites can burrow.

Conductive sensing loop 118 and substrate 120 are shown in an exploded view in FIG. 7. As can be seen in such view, conductive loop 118 comprises a pair of ends (130 and 132). End 130 is connected to a first prong 134, and end 132 is connected to a second prong 136. Prongs 134 and 136 comprise conductive materials, such as, for example, metal, and can alternatively be referred to as conductive extensions.

Substrate 120 comprises a surface 119, and such surface defines a plane along which conductive sensing loop 118 extends. Sensing s loop 118 is thus a planar conductive loop. Prongs 134 and 136 extend along surface 119, and accordingly extend along the plane defined by surface 119. Further, prongs 134 and 136 comprise portions 138 and 140, respectively, which extend beyond surface 119, but which continue to extend along the plane defined by surface 119.

In the shown embodiment, substrate 120 comprises a generally rectangular shape, having opposing sides 121 and 123, and opposing ends 141 and 143. Prongs 134 and 136 extend outwardly from end 143.

Referring again to FIG. 6, device 100 further comprises a circuit board 150 having circuitry (not shown in FIG. 6) supported thereby and a pair of orifices (152 and 154) extending therethrough. Board 150 can be considered as a circuit support. Shelf 112 has a pair of orifices 156 and 158 extending therethrough, and configured to be aligned with orifices 152 and 154 of circuit board 150. In operation, device 100 is assembled by providing substrate 120 within holder 114 such that prongs 134 and 136 extend through orifices 156, 158, 152 and 154 to retain circuit board 150 atop shelf 112. Circuit board 150 can then be adhered to shelf 112 and/or prongs 134 and 136. In an exemplary embodiment, circuit board 150 is adhered to prongs 134 and 135 with solder. Blocks 20 and 22 are subsequently provided within holder 110 to form an assembly 160 which can be removably inserted within receptacle 14. In alternative terminology, assembly 160 can be referred to as a composite block 160 which comprises wooden blocks 20 and 22, and planar sensing loop 118. Composite block 160 comprises an outer periphery extending around edges 121, 123, 141 and 143 of substrate 120, and prongs 134 and 136 extend outwardly from such outer periphery.

In preferred embodiments, the circuitry supported by circuit board 150 comprises at least a portion of a transponder unit and is configured to be incorporated into a passive RFID system. A suitable transponder unit can comprise an antenna, capacitor and circuit. In the shown embodiment, an antenna 155 is provided externally of the circuitry supported by board 150. A suitable circuit board/transponder unit assembly can be constructed utilizing methodology described in U.S. patent application Ser. No. 08/705,043, filed Aug. 29, 1996, which is assigned to the assignee of the present invention and hereby incorporated by reference. An interrogator (such as the interrogator 45 of FIG. 5) can be passed over the transponder unit associated with board 150 to cause a signal to be sent from the transponder unit to the interrogator. In such preferred applications, a loop antenna (not shown) can be provided on shelf 112 and in electrical connection with the transponder unit.

A signal sent from the transponder unit associated with board 150 to the interrogator can identify the particular transponder unit, and can also identify if conductive loop 118 is broken (i.e., if the conductive loop has changed from being a closed circuit component to being an open circuit component). For instance, the transponder unit can be configured such that a break in circuit 118 will change an ID number of the transponder unit. As an example, the transponder unit can be configured to have a normal ID number of 12345 and be configured such that opening of circuit 118 will change such number to 54321. Alternatively, the transponder unit can be configured such that a break in circuit 118 will transpose the first and last ID numbers of the transponder, the first two numbers of the transponder, the last two numbers of the transponder unit, etc.

By having a signal from the transponder unit change with a break in circuit 118, device 100 can indicate if damage has occurred to loop 118 through a signal sent to an interrogator. Such can enable persons utilizing the device to ascertain if termites are present without having to remove blocks 20 and 22 from receptacle 14, and even without having to remove the lid 18 from receptacle 14. Once damage to circuit 118 is detected with an interrogator, persons can remove assembly 160 and quantitate an amount of damage occurring within blocks 20 and 22 to determine an extent of a termite infestation.

Figure 8:
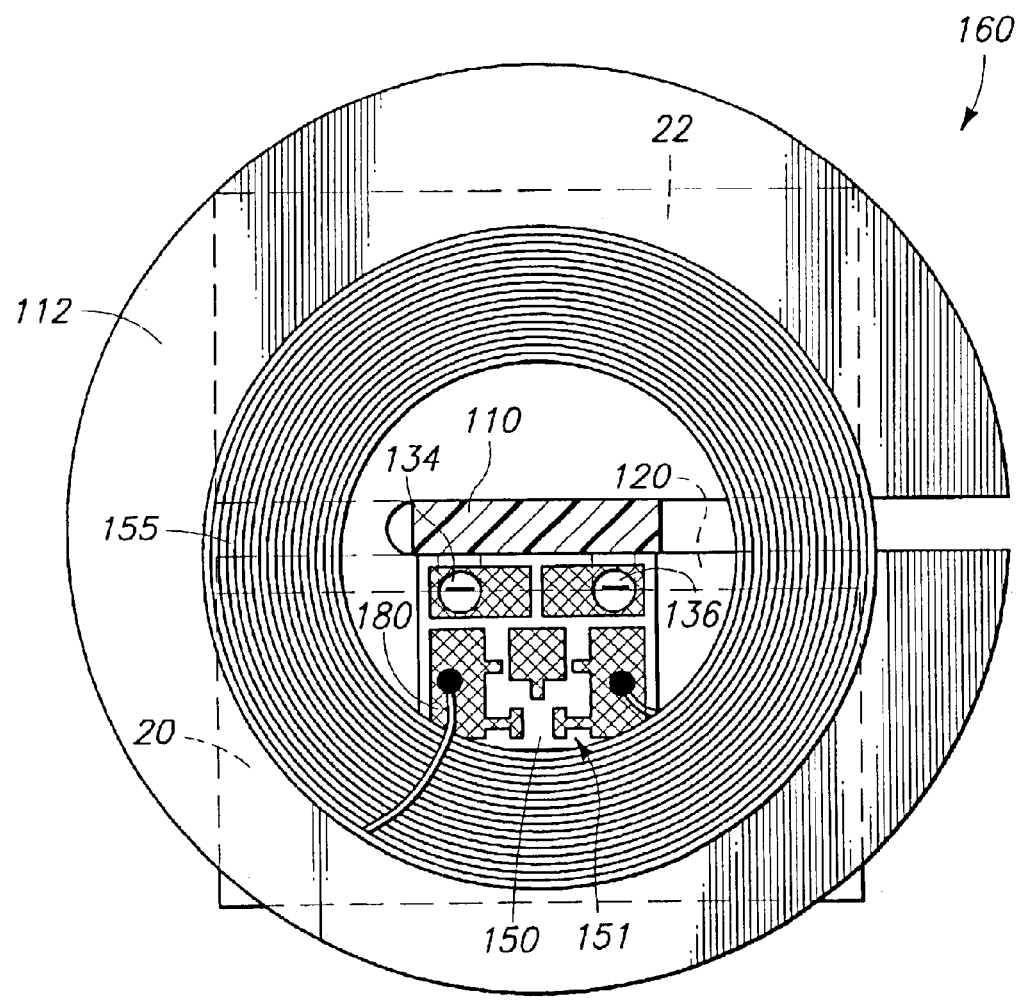
FIG. 8 is a diagrammatic end view of an assembled portion of the device of FIG. 6.

A preferred orientation of circuit board 150 relative to substrate 120 is shown in FIG. 8. Specifically, FIG. 8 illustrates a top, cross-sectional view of assembly 160. The cross-sectional view extends through holder 110 at a location above shelf 112. In such view it can be seen that circuit board 150 rests upon shelf 112. Circuit board 150 comprises a planar upper surface 151 and circuitry 180 upon such surface. Circuitry 180 accordingly extends along a plane defined by surface 151. Substrate 120 (shown in phantom) extends downwardly into assembly 160. Accordingly, the surface 119 (FIG. 7) of substrate 120 extends perpendicularly to the surface 151 of circuit board 150. As the loop of sensing circuitry 118 (FIG. 7) extends along a plane defined by surface 119 (FIG. 7) of substrate 120, and as transponder circuitry 180 extends along a plane of upper surface 151 of circuit board 150, transponder circuitry 180 extends along a plane perpendicular to the plane along which sensing loop 118 (FIG. 7) extends.

Figure 3:
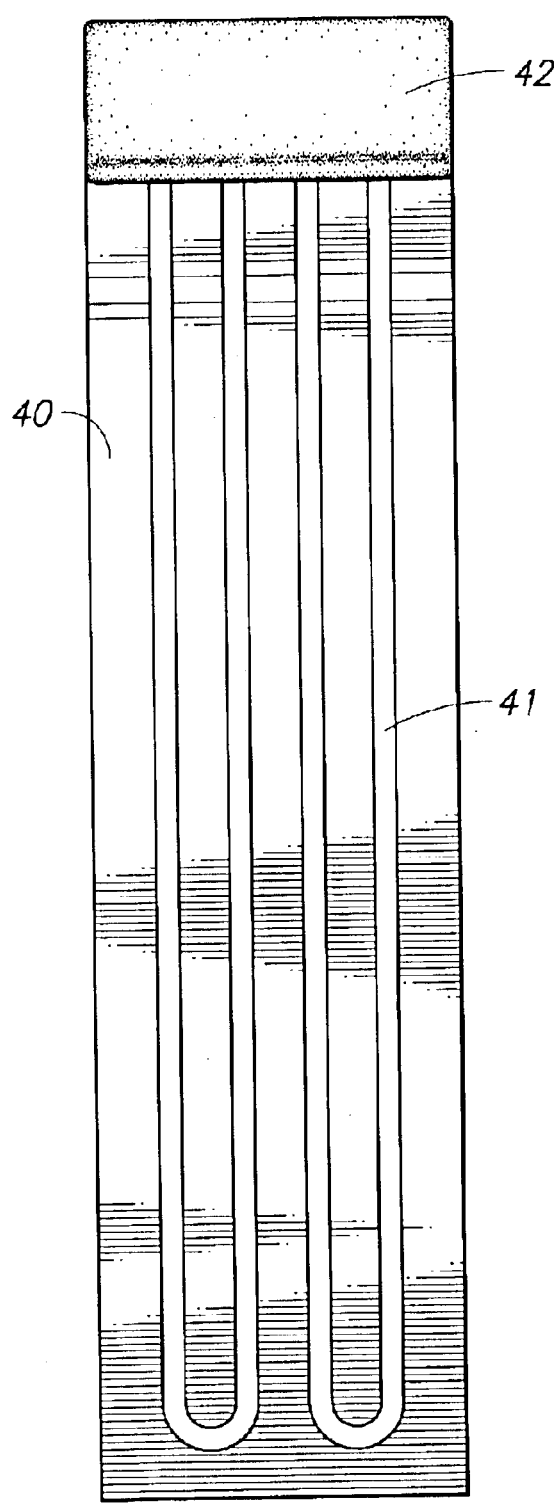
FIG. 3 is a diagrammatic side view of a prior art electronic sensor configured to detect termite infestation.

The construction of FIG. 8 can be simpler to use than that of prior art FIG. 3. Specifically, in both the construction of FIG. 8 and that of FIG. 3, it is desirable to have transponder circuitry extending substantially horizontally with a ground surface, and a loop of conductive sensing material extending substantially downwardly into the ground. The transponder circuitry is preferably horizontal to the ground surface as such can enhance interaction of the transponder circuitry with an interrogator signal. The loop of sensing conductive material preferably extends downwardly into the ground as such can provide an extended surface which can be attacked by infesting termites. In the prior art embodiment of FIGS. 3 and 4, any horizontal configuration of the printed wiring board 42 and vertical configuration of the conductive sensing loop 41 is accomplished by having a relatively long and flexible substrate 40 bent within receptacle 14 (receptacle 14 is not shown in the embodiment of FIGS. 3 and 4). If the bend is too severe, circuitry of loop 41 (which is formed on substrate 40) will be broken. Accordingly, it is difficult to accomplish a horizontal orientation of the board 42 and a vertical orientation of conductive loop 41. In contrast, the horizontal configuration of transponder circuitry 180 and vertical configuration of sensing loop 118 of the embodiment of FIGS. 6–8 is accomplished by having the transponder circuitry connected to sensing loop 118 through a pair of prongs extending parallel to the sensing loop and perpendicular to the transponder circuitry.

Figure 9:
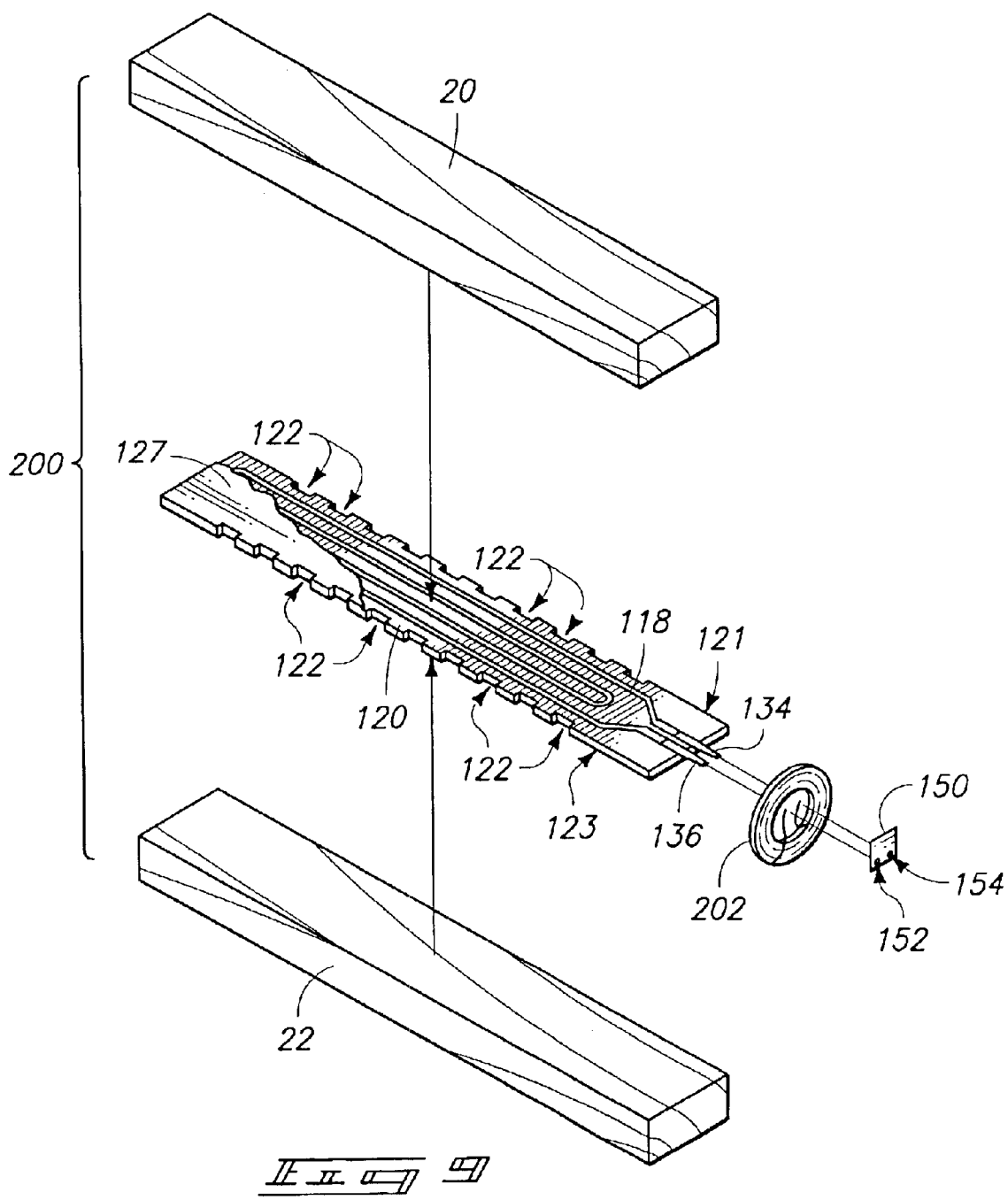
FIG. 9 is a diagrammatic, perspective view of a disassembled component of a termite-sensing device in accordance with a second embodiment of the present invention.

Another embodiment of the present invention is described with reference to FIGS. 9–12. Referring to FIG. 9, a termite sensing assembly 200 is shown in a disassembled view. Assembly 200 is similar to the assembly 160 described above with reference to FIG. 6, in that assembly 200 comprises a first wooden block 20, a second wooden block 22, a substrate 120 having circuitry 118 provided thereon, and a circuit board 150. Assembly 200 differs from assembly 160 in that there is no provision of a holder 110. Also, assembly 200 differs from assembly 160 in that a loop antenna 202 is illustrated as part of assembly 200. Loop antenna 202 is configured to be used with transponder circuitry associated with board 150.

Figure 10:
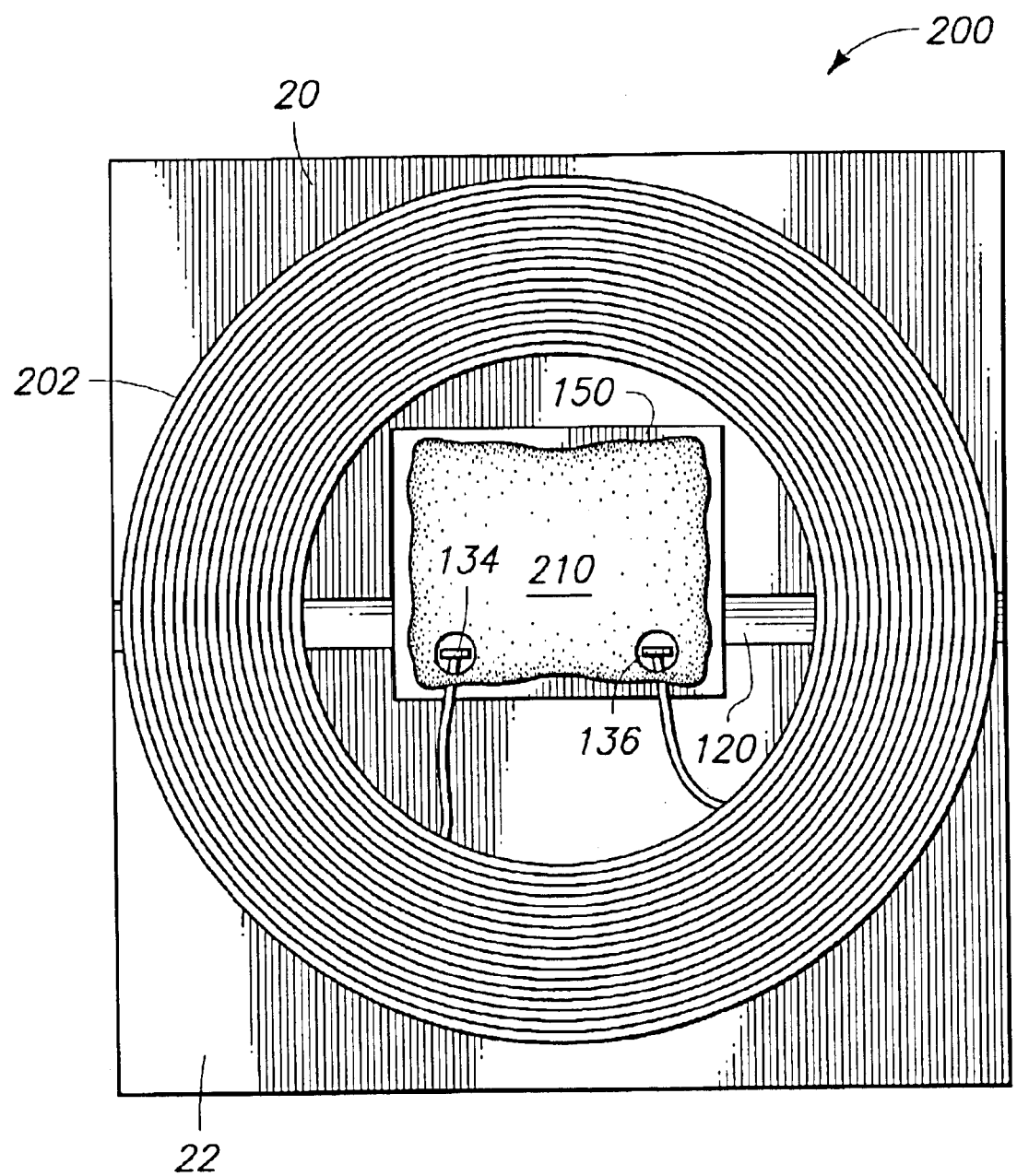
FIG. 10 is a diagrammatic end view of an assembly comprising the component of FIG. 9.

Referring to FIG. 10, assembly 200 is shown assembled. Antenna 202 and circuit board 150 rest on blocks 20 and 22, and substrate 120 is provided between blocks 20 and 22. Prongs 134 and 136 extend upwardly from substrate 120 and through orifices 152 and 154 (not shown) of circuit board 150. In the shown embodiment, an encapsulant 210 is provided over circuitry (not shown) on circuit board 150 to cover and protect such circuitry. In other embodiments (not shown) such encapsulant can be replaced with other protective materials over board 150, such as, for example, a molded cover. Prongs 132 and 134 can be adhered to the circuitry on circuit board 150 by solder. Such solder can also adhere and electrically connect circuit board 150, antenna 202, and circuitry 118 (FIG. 9) to one another. To further retain assembly 200 together, blocks 20 and 22 can be fastened to one another with, for example, staples or glue.

Figure 11:
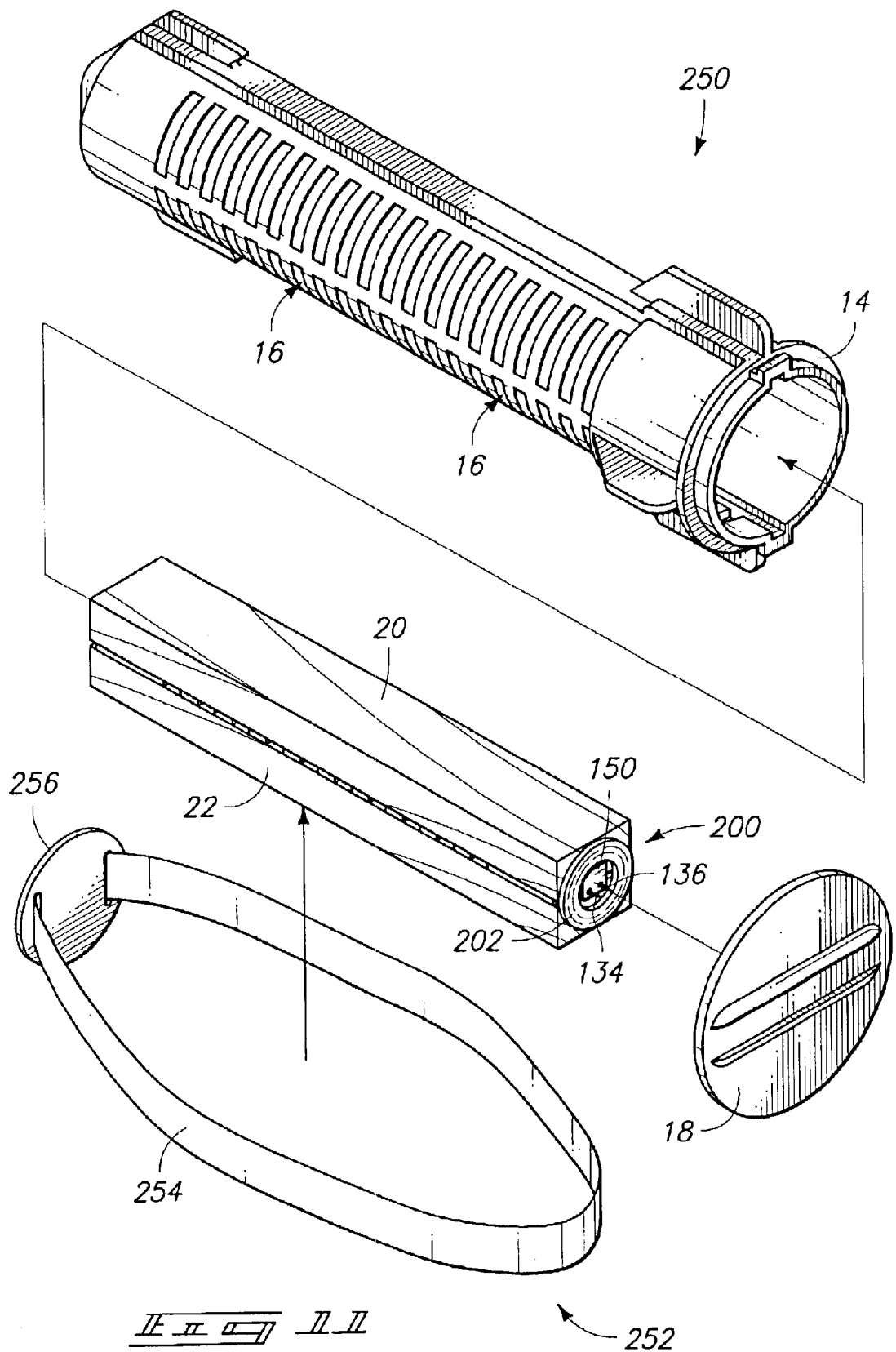
FIG. 11 is a diagrammatic, perspective view of a disassembled termite sensing device comprising the component of FIGS. 9 and 10.
Figure 12:
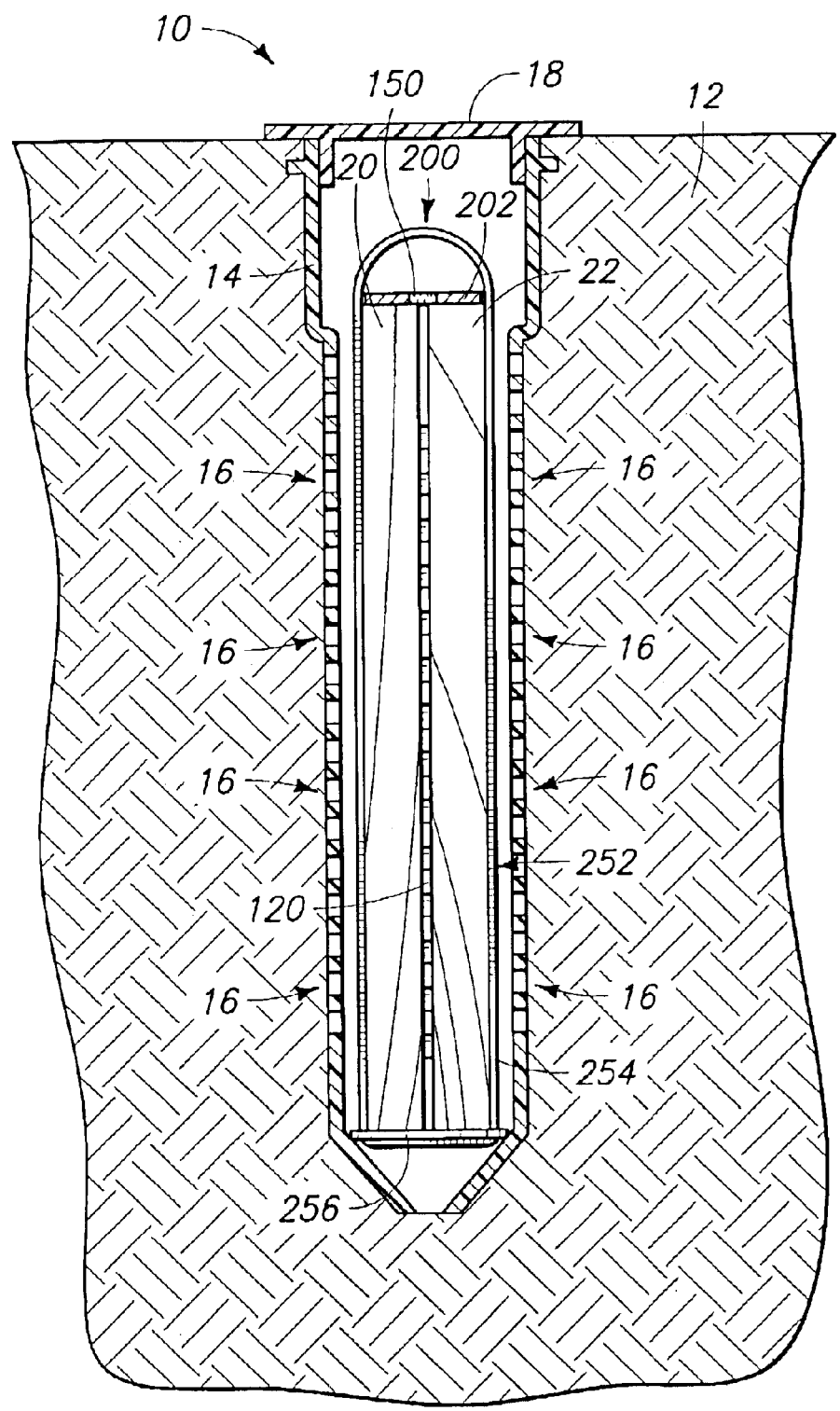
FIG. 12 is a diagrammatic, cross-sectional view of the termite sensing device of FIG. 11 in an assembled configuration and embedded in the ground.

FIG. 11 illustrates a disassembled device 250 comprising the assembly 200 of FIG. 10. Device 250 comprises a receptacle 14 and a lid 18 configured to be provided over receptacle 14. Device 250 further comprises a holder 252 for holding assembly 200 within receptacle 14. Holder 252 comprises a strap 254 joined to a shelf 256. In operation, assembly 200 is placed on shelf 256 and within strap 254. Holder 252 and assembly 200 are then inserted into device 14. Assembly 200 rests on shelf 256 within receptacle 14. Subsequently, assembly 200 can be withdrawn from receptacle 14 by pulling on strap 252. FIG. 12 illustrates a cross-sectional view of an assembled device 250 inserted within the ground 12.

Figure 13:
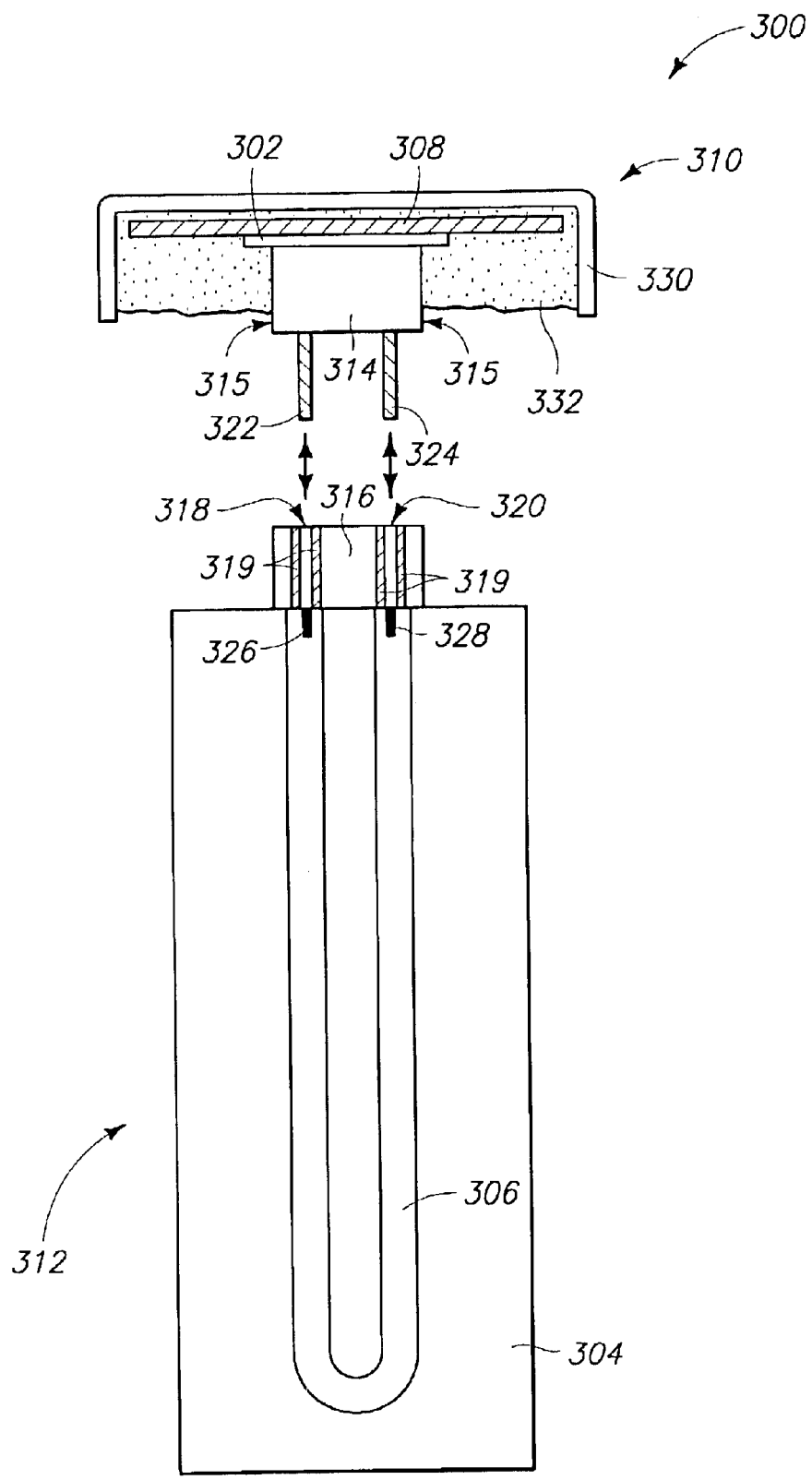
FIG. 13 is a diagrammatic, cross-sectional view of another electrical apparatus encompassed by the present invention.

Another electrical apparatus encompassed by the present invention is shown in FIG. 13 as an apparatus 300. Apparatus 300 comprises a transponder portion 310 which can be removably coupled with a sensor portion 312. Transponder portion 310 comprises first substrate 302 having a portion of an RFID circuitry, such as, for example, transponder circuitry (not shown) supported thereby. Substrate 392 can comprise, for example, a circuit board of the type described previously as circuit board 150 in FIG. 8, and the transponder circuitry can be similar to the transponder circuitry 180 described previously. An antenna 308 is proximate substrate 302, and comprises another portion of the RFID circuitry. Transponder portion 310 further comprises a vessel 330, and an encapsulant 332 (which can comprise, for example, an epoxy) within the vessel. Encapsulant 332 adheres a male connector 314 to substrate 302, as well as adhering vessel 330 to substrate 302 and connector 314. In the shown embodiment, connector 314 comprises a peripheral sidewall 315, and epoxy 332 extends at least partially along such peripheral sidewall.

Sensor portion 312 comprises a second substrate 304 having sensor circuitry 306 supported thereby. Substrate 304 and sensor circuitry 306 can comprise, for example, constructions similar to those described above with reference to substrate 120 and circuitry 118. Sensor portion 312 further comprises a female connector 316 attached to substrate 304. The attachment can be accomplished with, for example, an adhesive (such as, for example, glue or epoxy), or a mechanical fastener (such as, for example, a screw or staple).

Transponder portion 310 is configured to be removable attachable with sensor portion 312 through male connector 314 and female connector 316. In the shown embodiment, male connector 314 is joined with first substrate 302 and constitutes part of transponder portion 310, and female connector 316 is joined to second substrate 304 to constitute part of sensor portion 312. It is to be understood, however, that the relative positions of male and female connectors 314 and 316 can be reversed, such that the female connector is associated with transponder portion 310 and the male connector is associated with sensor portion 312. It is also to be understood that the shown utilization of a male connector and a female connector is an exemplary embodiment of the present invention, and that other coupling mechanisms can be utilized for removably attaching transponder portion 310 to sensor portion 312. Such other mechanisms will generally utilize a receiving structure associated with one of the RFID circuitry and sensor circuitry (with the shown receiving structure being female connector 316), and a connecting structure associated with the other of the RFID circuitry and the sensor circuitry (with the shown connecting structure being the male connector 314). Other connecting structure/receiving structure pairs besides the shown male connector/female connector embodiment include, for example, so-called hook and loop connections (i.e. VELCRO™), clamps, screws, and readily broken adhesive couplings.

The female connector 316 of the shown embodiment can be considered a receptacle having orifices 318 and 320 extending therein, and the male connector 314 can be considered an electrical plug having electrical extensions (i.e., prongs) 322 and 324 extending therefrom. Thus in the shown embodiment, transponder portion 310 comprises an RFID/plug assembly and sensor portion 312 comprises a sensor/receptacle assembly. Prongs 322 and 324 are complementary with orifices 318 and 320 of the receptacle such that prongs 322 and 324 extend through orifices 318 and 320 to electrically connect with circuitry 306. In the shown embodiment, conductive pads 326 and 328 are provided on circuitry 306 and beneath orifices 318 and 320, respectively, to electrically connect with ends of prongs 322 and 324. Although the shown embodiment utilizes a receptacle having two orifices therein, and an electrical plug having two prongs extending therefrom, it is to be understood that the invention encompasses other embodiments (not shown) wherein other than 2 orifices extend into a receptacle, and wherein other than two prongs extend from an electrical plug. For instance, the invention encompasses embodiments wherein at least one orifice extends into the receptacle, and wherein at least one prong extends from a plug. Also, it is to be understood that although the invention utilizes a plug having the same number of prongs as there are orifices in a complementary receptacle, the invention encompasses other embodiments (not shown) wherein the plug encompasses a different number of prongs than there are orifices provided in the receptacle. Further, it is to be understood that although the prongs are shown extending into orifices in a receptacle, the invention encompasses other embodiments (not shown) wherein the prongs extend around a receptacle to effectively clamp the receptacle between the prongs.

Receptacle 316 can comprise one or both of a conductive and insulative material. In preferred embodiments, receptacle 316 comprises a mass of electrically insulative material, such as, for example, a mass of plastic. Orifices 318 and 320 extend through the mass, and are lined with an electrically conductive material 319, such as, for example, a copper film.

In operation, sensor portion 312 can be placed between a pair of wooden blocks (such as the blocks 20 and 22 discussed above) and utilized for sensing the presence of termites. Preferably, conductive material 306 will comprise a material which can be removed by termites, such as, for example, the materials described above for conductive loop 118. The transponder circuitry of transponder portion 310 is electrically connected with loop 306 by inserting prongs 322 and 324 into orifices 318 and 320. The transponder circuitry is configured to emit, a first signal if conductive loop 306 is intact, and to emit a second signal, different from the first, if conductive loop 306 is broken. Accordingly, if termites remove sufficient material from conductive loop 306 to break the loop, a signal from the transponder circuitry changes to indicate the broken loop, and accordingly, the presence of termites. It is noted that although the shown conductive loop 306 is a single loop of conductive material, other constructions for the conductive loop can be utilized, such as, for example, the constructions described, in U.S. patent application Ser. No. 09/373,892.

Once conductive loop 306 is broken, transponder portion 310 can be removed from sensor portion 306, and reused with a new sensor portion. Accordingly, the removable coupling of transponder portion 310 with sensor portion 312 enables transponder portion 310 to be reused after a sensor portion 312 is rendered inoperable. Such can save expense by enabling a single transponder portion to be used multiple times. Another advantage of the removable coupling of transponder portion 310 with sensor portion 312 is that such can simplify transport of termite sensing apparatus 300 to the field, relative to the transport of other termite sensing apparatuses. Specifically, such can enable sensor portion 312 to be transported to the field separately from transponder portion 310, and can enable both the sensor portion 312 and the transponder portion 310 to be constructed as relatively robust separate packages. In contrast, in embodiments in which transponder portion 310 is not provided to be removably attached to sensor portion 312, there can be a weak connection between transponder circuitry and sensor circuitry which can break during transport of a termite sensing apparatus. The relative robust separate packaging of transponder circuitry 310 and sensor circuitry 312 of the apparatus 300 of FIG. 13 can alleviate the problems associated with a weak connection in other termite sensing apparatuses.

Figure 14:
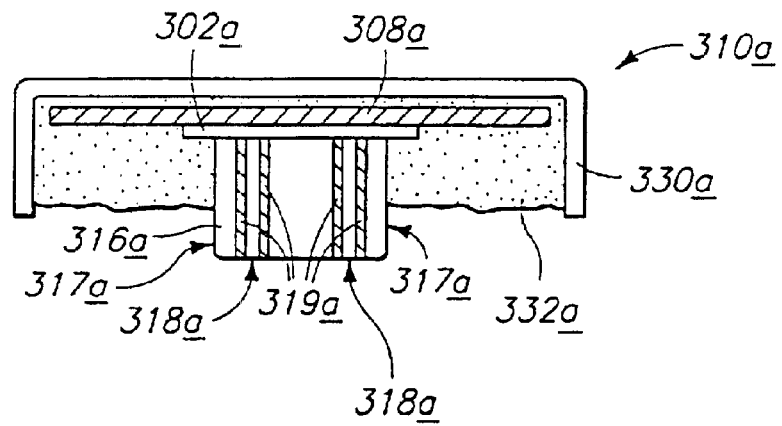
FIG. 14 is a diagrammatic, cross-sectional view of a portion of yet another embodiment electrical apparatus encompassed by the present invention.

Another embodiment transponder portion 310a is shown in FIG. 14. In describing the embodiment of FIG. 14, similar numbering will be utilized as was used in describing the embodiment of FIG. 13, with the suffix "a" used to refer to structures shown in FIG. 14. Transponder portion 310a comprises a circuit support substrate 302a, and an antenna 308a, electrically connected to transponder circuitry (not shown) supported by circuit support 302a. A receptacle 316a is joined to support 302a. Note that in the embodiment of FIG. 14, unlike the embodiment of FIG. 13, the receptacle is joined to the transponder portion, rather than to the sensor portion, so that transponder portion 310a comprises an RFID/receptacle assembly.

Orifices 318a and 320a extend into receptacle 316a and are configured to receive prongs from a plug (not shown) joined with a sensor portion (not shown). Receptacle 316 can comprise, for example, a commercially available electronic connector, with copper traces lining orifices 318a and 320a. Transponder portion 310a comprises a vessel 330a, and an encapsulant 332a (which can comprise, for example, an epoxy) within the vessel and adhering receptacle 316a to substrate 302a, as well as adhering vessel 330a to substrate 302a and receptacle 316a. Antenna 308a can be adhered to circuitry on support 302a, and can be further adhered to support 302a through epoxy 332a.

Receptacle 316a comprises a peripheral outer sidewall 317a and encapsulant 332a extends at least partially along such peripheral outer sidewall.

Figure 15:
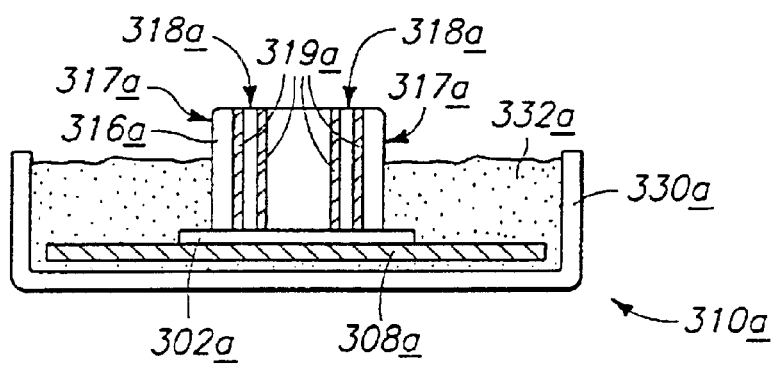
FIG. 15 is a diagrammatic, cross-sectional view of the FIG. 14 apparatus illustrating a method of forming the FIG. 14 apparatus.

A method of forming transponder portion 310a is described with reference to FIGS. 15 and 16. Referring to FIG. 15, antenna 308a and circuit support 302a are provided within vessel 330a (vessel 330a can be, for example, a potting shell), and receptacle 316a is provided thereover. Subsequently, liquid epoxy 332a is provided over circuit support 302a, antenna 308a, and at least a portion of sidewalls 317a, a receptacle 316a, and allowed to cure. Epoxy 332a then forms an encapsulant adhering receptacle 316a to antenna 308a and circuit support 302a. It is noted that vessel 330a can be lined with a release layer (such as, for example, an oil) so that epoxy 332a does not adhere to vessel 330a. Accordingly, a structure comprising the cured epoxy 332a, receptacle 316a, circuit support 302a and coil 308a can be removed from within vessel 330a. Alternatively, no release layer can be provided, and epoxy 332a can be utilized to adhere vessel 330a to structure 316a, 302a and 308a. The particular material utilized for vessel 330a can determine whether it is advantageous to leave the vessel adhered to structures 316a, 302a and 308a, or to remove the vessel. For instance, if vessel 330a comprises a conductive material, such as, for example, a metal, it can be advantageous to remove the vessel so that the conductive material does not interfere with the performance of antenna 308a. Alternatively, if vessel 330a comprises an insulative material, such as, for example, a plastic, it can be advantageous to leave the vessel adhered to structures 316a, 302a and 308a, as such simplifies fabrication of transponder portion 310a, and the adhered vessel provides a protective cap over structures 316a, 302a and 308a.

Figure 16:
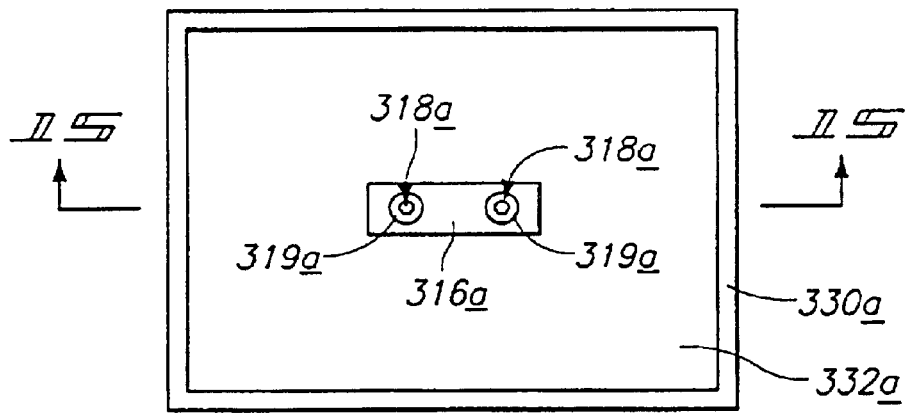
FIG. 16 is a top view of the FIG. 15 apparatus, and shows a line 15—15 along which the view of FIG. 15 is oriented.

A top view of the FIG. 15 construction is shown in FIG. 16. Such top view illustrates an exemplary construction of receptacle 316a wherein the receptacle comprises an end in the shape of a long and thin rectangle. It is noted that although in the shown embodiment an entirety of circuit support 302a and antenna 308a are within vessel 330a, and only a portion of receptacle 316 is within vessel 330a, the invention encompasses other configurations. For instance, the invention encompasses embodiments wherein an entirety of receptacle 316a is received within vessel 330a (i.e., where an uppermost surface of receptacle 316a in the FIG. 15 view is beneath an uppermost surface of vessel of 330a), as well as embodiments wherein only portions of one or both of circuit support 302a and antenna 308a are received within vessel 330a.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. An electrical apparatus comprising:
    RFID circuitry on a first substrate;
    sensor circuitry on a second substrate;
    a receiving structure associated with one of the RFID circuitry and the sensor circuitry;
    at least one connecting structure associated with the other of the RFID circuitry and the sensor circuitry and removably received within the receiving structure; and
    wherein the sensor circuitry comprises a loop of conductive material removable by termites and is thereby configured to sense the presence of termites; the conductive material including one or both of carbon particles and metal particles.

2. The apparatus of claim 1 wherein the conductive material comprises a carbon-particle-containing ink.

3. The apparatus of claim 1 wherein the conductive material comprises silver particles.

4. An electrical apparatus comprising:
    RFID circuitry on a first substrate;
    sensor circuitry on a second substrate;
    a receptacle associated with one of the RFID circuitry and the sensor circuitry, the receptacle having at least one orifice extending therein;
    at least one extension associated with the other of the RFID circuitry and the sensor circuitry and removably inserted within the receptacle; and
    wherein the second substrate comprises foam, wherein the circuitry on the second substrate comprises a conductive carbon-containing material which can be removed by termites, and wherein the RFID circuitry is configured to send a different signal to an interrogator if at least some of the conductive material has been removed than if none of the conductive material is removed.

5. A method of forming an electrical apparatus, comprising:

providing a first substrate having RFID circuitry thereon;

providing a second substrate having sensing circuitry thereon;

joining a receptacle with one of the RFID circuitry and the sensor circuitry, the receptacle having at least one orifice extending therein; and joining at least one prong with the other of the RFID circuitry and the sensor circuitry;

removably inserting the prong within the receptacle to electrically connect the RFID circuitry with the sensing circuitry; and wherein the second substrate comprises foam, wherein the circuitry on the second substrate comprises a conductive material which can be removed by termites, the conductive material comprising one or both of carbon particles and metal particles; and wherein the RFID circuitry is configured to send a different signal to an interrogator if at least some of the conductive material has been removed than if none of the conductive material is removed.

6. The method of claim 5 wherein the receptacle is joined to the first substrate and the prong is joined to the second substrate; and if the RFID circuitry is sending a signal indicative of at least some of the conductive material having been removed, further comprising:

removing the RFID circuitry from the sensing circuitry by detaching the prong from the receptacle, and inserting an other prong into the receptacle, said other prong being joined to an other second substrate having an other sensing circuitry thereon.

7. The method of claim 5 wherein the prong is joined to the first substrate and the receptacle is joined to the second substrate; and if the RFID circuitry is sending a signal indicative of at least some of the conductive material having been removed, further comprising:

removing the RFID circuitry from the sensing circuitry by detaching the prong from the receptacle, and inserting the prong into an other receptacle, said other receptacle being joined to an other second substrate having an other sensing circuitry thereon.

8. The method of claim 5 wherein the conductive material comprises carbon particles.

9. The method of claim 5 wherein the conductive material comprises silver particles.

* * * * *

UNITED STATES PATENT AND TRADEMARK OFFICE
CERTIFICATE OF CORRECTION

PATENT NO. : 6,882,284 B2
DATED : April 15, 2005
INVENTOR(S) : Lake et al.

It is certified that error appears in the above-identified patent and that said Letters Patent is hereby corrected as shown below:

Title Page,
Item [56], References Cited, U.S. PATENT DOCUMENTS, insert the following before
"5,815,090 A   *   9/1998       Su      340/870.16":
-- 3,778,805   12/1973     Gould
   4,136,338   01/1979     Antenore
   4,455,441   06/1984     Prestwich
   4,737,789   04/1988     Nysen
   4,937,555   06/1990     Litzkow et al.
   4,951,057   08/1990     Nagel
   5,024,832   06/1991     Omata et al.
   5,182,420   01/1993     Steitz et al.
   5,205,032   04/1993     Kuroda et al.
   5,266,746   11/1993     Nishihara et al.
   5,274,570   12/1993     Izumi et al.
   5,329,726   07/1994     Thorne
   5,384,691   01/1995     Neugebauer et al.
   5,428,345   06/1995     Bruno
   5,459,284   10/1995     Bockelman et al.
   5,471,010   11/1995     Bockelman et al.
   5,571,967   11/1996     Tanaka
   5,575,105   11/1996     Otomo
   5,592,774   01/1997     Galyon
   5,646,404   07/1997     Litzkow et al.
   5,648,758   07/1997     Tweadey --; insert the following before
"6,025,783 A   *   2/2000       Steffens, Jr    340/644":
-- 5,877,422   03/1999     Otomo
   5,950,356   09/1999     Nimocks
   5,974,344   10/1999     Shoemaker
   5,977,913   11/1999     Christ
   6,016,625   01/2000     Bishoff et al. --; insert the following before
"6,100,805 A *     8/2000       Lake    340/573.1 ":
-- 6,052,066   04/2000     Su
   6,061,243   05/2000     Barnett et al.
   6,091,332   07/2000     Eberhardt et al. -- insert the following before
"6,255,959 B1 *    7/2001       Lake et al      340/693.5":
-- 6,130,602   10/2000     O'Toole
   6,150,944   11/2000     Martin et al.
   6,189,208 B1 02/2001    Estes et al.-- insert the following before
"6,313,748 B1 *    11/2001      Lake    340/573.2":
-- 6,265,674 B1  07/2001   Kato --; insert the following before

UNITED STATES PATENT AND TRADEMARK OFFICE
CERTIFICATE OF CORRECTION

PATENT NO. : 6,882,284 B2
DATED : April 15, 2005
INVENTOR(S) : Lake et al.

It is certified that error appears in the above-identified patent and that said Letters Patent is hereby corrected as shown below:

Title Page (cont'd),
"6,397,516 B1 *     6 /2002      Su      43/124":
-- 6,313,643 B1     11/2001      Tirkel et al.
   6,370,812 B1    04/2002      Burns et al. --; insert the following after
"6,404,210 B1 *    6/2002       Su      324/692":
-- 2002/0144453 A1  10/2002      Su
   2001/0033230 A1  10/2001      Barber et al.

OTHER PUBLICATIONS
WEBSITE: Dow AgroSciences, "Sentricon Colony Elimination System", 1998, 7 pages. --.
Item [57], ABSTRACT,
Line 7, replace "removable" with -- removably --.

Column 3,
Line 5, replace "removable" with -- removably --.
Line 11, delete "S" after "one".

Column 6,
Line 52, delete "s" after "Sensing".

Column 9,
Line 18, delete "392" after "Substrate" and insert -- 305 --.
Line 42, replace "removable" with -- removably --.

Column 11,
Line 18, insert -- of -- after "embodiment".

Signed and Sealed this

Seventh Day of February, 2006

JON W. DUDAS
*Director of the United States Patent and Trademark Office*

UNITED STATES PATENT AND TRADEMARK OFFICE
CERTIFICATE OF CORRECTION

PATENT NO.    : 6,882,284 B2
DATED         : April 19, 2005
INVENTOR(S)   : Lake et al.

It is certified that error appears in the above-identified patent and that said Letters Patent is hereby corrected as shown below:

<u>Title Page,</u>
Item [56], References Cited, U.S. PATENT DOCUMENTS, insert the following before
"5,815,090 A    *    9/1998    Su    340/870.16":
-- 3,778,805    12/1973    Gould
   4,136,338    01/1979    Antenore
   4,455,441    06/1984    Prestwich
   4,737,789    04/1988    Nysen
   4,937,555    06/1990    Litzkow et al.
   4,951,057    08/1990    Nagel
   5,024,832    06/1991    Omata et al.
   5,182,420    01/1993    Steitz et al.
   5,205,032    04/1993    Kuroda et al.
   5,266,746    11/1993    Nishihara et al.
   5,274,570    12/1993    Izumi et al.
   5,329,726    07/1994    Thorne
   5,384,691    01/1995    Neugebauer et al.
   5,428,345    06/1995    Bruno
   5,459,284    10/1995    Bockelman et al.
   5,471,010    11/1995    Bockelman et al.
   5,571,967    11/1996    Tanaka
   5,575,105    11/1996    Otomo
   5,592,774    01/1997    Galyon
   5,646,404    07/1997    Litzkow et al.
   5,648,758    07/1997    Tweadey --; insert the following before
"6,025,783 A    *    2/2000    Steffens, Jr    340/644":
-- 5,877,422    03/1999    Otomo
   5,950,356    09/1999    Nimocks
   5,974,344    10/1999    Shoemaker
   5,977,913    11/1999    Christ
   6,016,625    01/2000    Bishoff et al. --; insert the following before
"6,100,805 A *    8/2000    Lake    340/573.1 ":
-- 6,052,066    04/2000    Su
   6,061,243    05/2000    Barnett et al.
   6,091,332    07/2000    Eberhardt et al. -- insert the following before
"6,255,959 B1 *    7/2001    Lake et al    340/693.5":
-- 6,130,602    10/2000    O'Toole
   6,150,944    11/2000    Martin et al.
   6,189,208 B1    02/2001    Estes et al.-- insert the following before
"6,313,748 B1 *    11/2001    Lake    340/573.2":
-- 6,265,674 B1    07/2001    Kato --; insert the following before
"6,397,516 B1 *    6 /2002    Su    43/124":

UNITED STATES PATENT AND TRADEMARK OFFICE
CERTIFICATE OF CORRECTION

PATENT NO. : 6,882,284 B2
DATED : April 19, 2005
INVENTOR(S) : Lake et al.

It is certified that error appears in the above-identified patent and that said Letters Patent is hereby corrected as shown below:

Title Page (cont'd),
-- 6,313,643 B1    11/2001    Tirkel et al.
   6,370,812 B1    04/2002    Burns et al. --; insert the following after
"6,404,210 B1 *    6/2002    Su    324/692":
-- 2002/0144453 A1    10/2002    Su
   2001/0033230 A1    10/2001    Barber et al.
OTHER PUBLICATIONS
WEBSITE: Dow AgroSciences, "Sentricon Colony Elimination System", 1998, 7 pages. --.
Item [57], ABSTRACT,
Line 7, replace "removable" with -- removably --.

Column 3,
Line 5, replace "removable" with -- removably --.
Line 11, delete "S" after "one".

Column 6,
Line 52, delete "s" after "Sensing".

Column 9,
Line 18, delete "392" after "Substrate" and insert -- 305 --.
Line 42, replace "removable" with -- removably --.

Column 11,
Line 18, insert -- of -- after "embodiment".

This certificate supersedes Certificate of Correction issued February 7, 2006.

Signed and Sealed this

Twenty-eighth Day of March, 2006

JON W. DUDAS
*Director of the United States Patent and Trademark Office*